United States Patent Office 3,338,121
Patented Aug. 29, 1967

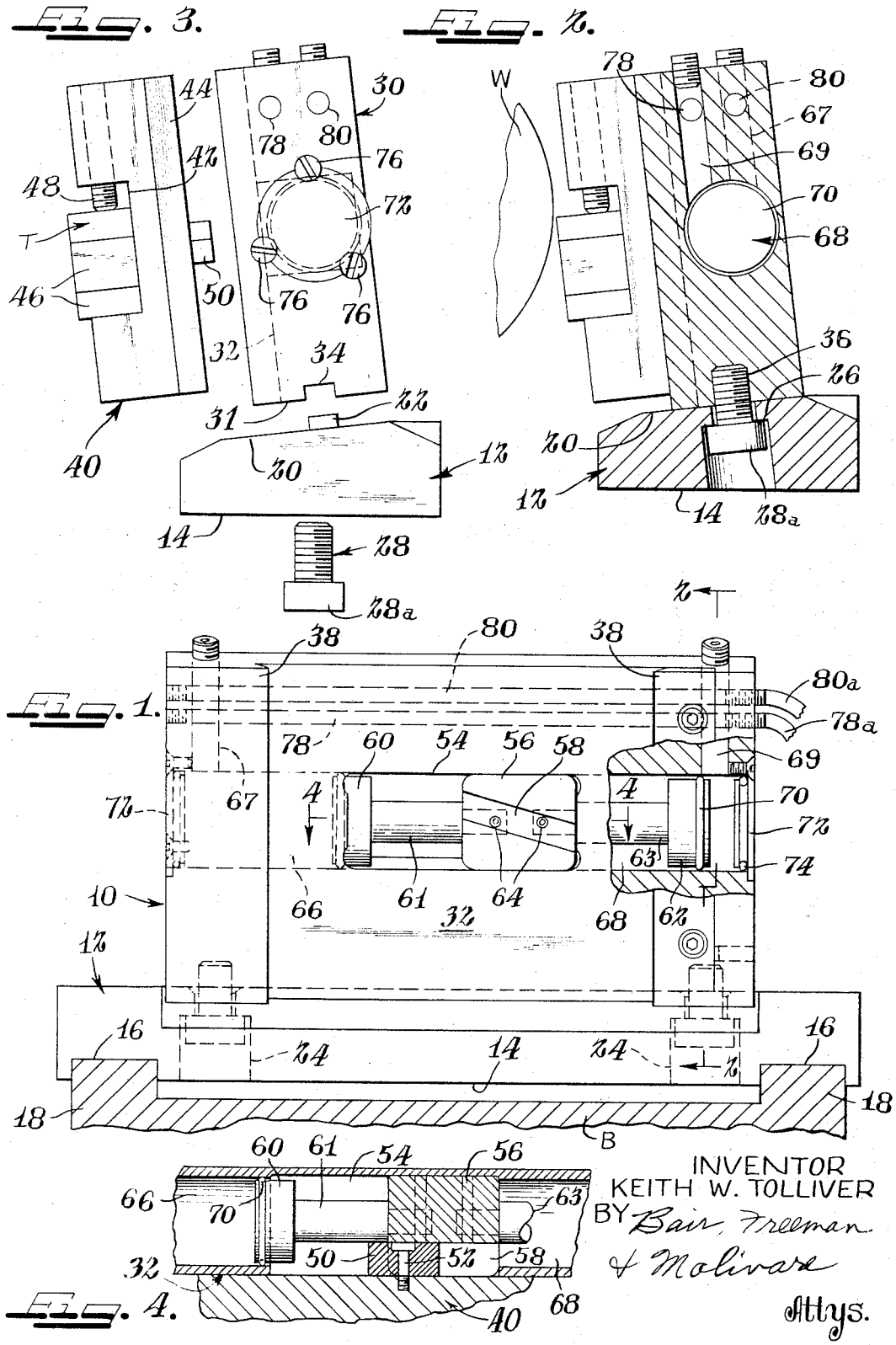

3,338,121
TOOL HOLDER FOR METAL TURNING
MACHINES
Keith W. Tolliver, 18312 Regal Road,
Homewood, Ill. 60430
Filed May 17, 1965, Ser. No. 456,425
6 Claims. (Cl. 82—24)

This invention relates to an improved tool holder for use with metal turning machines, such as lathes and the like, wherein the tool holder provides means for avoiding withdrawal marks by the tool on the work being processed.

The use of automatic lathe machines for producing finished quality work has increased greatly in recent years. However, in any automatic process it is necessary, at the end of the finishing process, to re-position the tool in a position to begin the processing of the next piece of work. In such re-positioning of the tool, the demands of providing for precision production normally requires that the work be held at a precise and invariable attitude, and therefore the tool is usually moved relative to the work piece by being retracted relative to the work and toward the starting point for the next cycle. Unfortunately, such retraction, or withdrawal, of the tool from its finish position, relative to the work, frequently produces a drag line or withdrawal mark on the work. While such marks can usually be removed by a separate finishing operation, the additional step increases the cost of production of the piece. In other instances, such as for example, where a precisely finished sealing surface for high pressure fluids is required on the piece being produced, the removal of all traces of withdrawal marks is imperative if the piece is to be approved for usage.

Thus, one object of this invention is to provide a new and improved tool holder for use with lathe machines or the like wherein means are provided on the tool holder for avoiding withdrawal marks by the tool on the work being processed.

Now, the problem of eliminating withdrawal marks has been known to the machine tool industry for many years, and others have heretofore sought to provide solutions to the problem by means of special tool-holding devices. It has been the experience with such prior tool-holding devices that they are limited in their usage to finishing operations that require only very shallow or small cuts by the tool up to a maximum cut of no more than about 1/16 inch of steel, and that such tool holders must vary in size for achieving the desired end and in effecting such tool cuts in the range of less than 1/16 inch; and, additionally, such prior devices require so much space that they cannot be used in the finishing of an end of a workpiece where the end of the piece is in close proximity to an upright frame part of the machine, such as the support for the chuck.

Thus, another object of this invention is to provide an improved tool holder for use with lathe machines or the like wherein means are provided for avoiding tool withdrawal marks on the work pieces, and wherein the tool holder is characterized by being of a nature such that the tool carried thereby is able to take substantial cuts in steel, up to as much as a ½ inch cut, and wherein the same tool holder may be used for taking a very wide range of cuts, from very shallow to deep, as desired.

And a further object of this invention is to provide a tool holder for avoiding tool withdrawal marks wherein the tool holder may be used to finish end faces of work pieces even when the work piece is being held at a very close spacing to the framework of the machine tool.

In the instant invention, the desired end of avoiding withdrawal marks on work pieces is achieved by providing a path of movement for the cutting tool, toward its starting point for the next cycle, that is outwardly and away (either downwardly or upwardly) from the line or surface being worked by the tool. Hence another object of this invention is to provide a tool holder which will insure such movement by the tool relative to the work, and which tool holder is capable of automatic operation thereof, and is characterized by simiplcity and inexpensiveness of construction thereof, and by efficiency of its operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIG. 1 is a side elevational view, with portions broken away and shown in cross-section, of a tool holder embodying the invention that is disclosed herein;

FIG. 2 is a cross-sectional view taken on line 2—2 of FIG. 1 and illustrating the relationship of the tool to a work piece; and FIG. 3 is an end elevational exploded view showing certain major components of the tool holder.

FIG. 4 is a fragmentary cross-sectional view taken substantially along the line 4—4 of FIG. 1 and showing the connection between the cam actuator and the cam follower.

Referring now to the drawing, there is shown one form of device embodying the invention herein disclosed, it being understood, by those skilled in the art, that the precise form disclosed presents only one form of structure that embodies the principles of my invention, and obviously other structures may be provided which embody the same principles for the same desired end.

In FIG. 1, the tool holder is generally indicated at 10, and the portion of the tool holder there shown is mounted on an adapter 12. The underside 14 of adapter 12 is machined precisely flat and is provided with a pair of spaced parallel inverted elongated channels, or recesses, 16 adapted for sliding cooperation with parallel tracks, or ways, 18 that are normally provided on a bed B of a lathe or other machine. The ways 18 of bed B provides what is known as a normally definitive surface on the lathe or machine tool.

The upper side of the adapter 12 is shaped to define a precisely flat bearing surface 20, as best seen in FIGS. 2 and 3, which is arranged at an incline of about 5° to the plane of side 14. Extending longitudinally of bearing surface 20 and normal to the directions of channels 16 is an elongated key or bar 22 which defines abutments shoulders thereon for cooperation with a registering member. The underside of adapter is bored or recessed at spaced points 24 for receiving therein the head 28a of machine bolt 28. The axes of recesses 24 are at an angle of 5° to the vertical so that the inner wall 26 of each recess 24 is substantially parallel to the bearing surface 20 and is adapted to have the head 28a of the bolt 28 abut thereagainst.

Rigidly mounted on bearing surface 20 is an upright support member 30 formed to provide thereon an upright planar guide surface 32. The abutment or lower edge 31 of support member 30 is precisely flat and engages the bearing surface 20, and there is provided an elongated recess or keyway 34 for cooperatingly receiving the longitudinal bar 22. The abutment edge 31 of support member 30 has also been drilled and tapped at 36 for receiving the threaded shank of bolt 28. Support member 30 is also provided with spaced inwardly facing dovetail means, or flanges, 38 that are inclined relative to guide surface 32 and cooperate therewith to provide a precise guide means for a movable tool carrier as hereinafter described.

Slidably mounted against and abutting the guide surface 32 and arranged for sliding only parallel to the dovetail flanges 38, is a tool carrier, generally indicated at 40. The tool carrier 40 is provided with a channel-shaped groove 42 that is maintained precisely parallel to the support surface 20. Member 40 is provided with parallel dovetail, or wedge-shaped tongues 44, extending in opposite directions laterally of member 40 and arranged for entry in and sliding cooperation with the dove-tail grooves 38. The channel-shaped recess 42 is adapted to receive a tool T therein, and appropriate shims, or support blocks, 46 may also be received in recess 42 for locating the cutting edge of tool T at a precise position. The tool T and shim 46 are clamped into position by one or more of a plurality of set screws 48 screwed into carrier 40 and arranged to be advanced into the recess 42. While the drawing does not show the spacing of the set screws 48, it will be evident that such spacing may be selected as desired, and in one tool constructed as disclosed herein, a spacing of 1⅜″ was selected.

Extending from the rear of tool carrier 40 is an elongated slide bar 50 that serves as a cam follower. The slide bar 50 is pivotally mounted on a pin 52 that is supported by and extends rearwardly of carrier 40.

The upright support member 30 carries thereon means for effecting selective movement of the tool carrier 40 longitudinally of the dovetail guides 38. There is a rectangular slot, or guideway, 54 in which is slidably positioned a cam block 56. The cam-block 56 has a diagonal slot 58 defined therein, where the width of the slot is arranged to precisely receive the slide bar bar 50 therein with substantially no play between the parts. It will be understood that as the cam-block 56 is moved laterally along the length of slot 54, the cooperation of slot 58 with slide bar 50 operates to move the tool carrier 40 longitudinally of the dovetail guides 38. The slot 58 is at an inclination of no more than 16° to the horizontal, and at that angle the movable parts will stay at the preselected position no matter what forces are applied to the tool carrier 40.

To actuate the cam-block 56 to move in opposite directions, any appropriate means may be used for applying a force onto the block 56 to cause it to move. Obviously electrically energized means, or fluid pressure means, or simple mechanical push means may be used.

In the particular construction disclosed, it is preferred to use fluid pressure means. Accordingly, there are provided pistons 60 and 62 connected by connecting rods 61 and 63 to opposite ends of cam-blocks 56. A pin connection 64 is provided in each instance to prevent binding. The support member 30 is appropriately hollowed out to provide cylinders 66 and 68, and the length of the cylinders is so selected to the length of the stroke of the pistons that each cylinder remains substantially fluid tight. Each piston carries an O-ring seal 70.

The end of each cylinder is closed off by a cap 72 which carries an O-ring seal 74. Each cap 72 is retained in position by a plurality of retainer screws 76. Cross bores 67 and 69 communicate respectively with the remote ends of cylinders 66 and 68, and the length of guideway 54 is so selected relative to the length of the cylinders that when block 56 is in its extreme positions, the cross bores 67 and 69 are not closed off and still communicate with their cylinders, as seen in FIG. 1. Elongated through bores 78 and 80 communicate respectively with cross bores 67 and 69. Thus, fluid pressure may be supplied at either end of bores 78 and 80, and the other end of said bores are closed off. When fluid pressure is supplied through nipple 78a to bore 78, the cam-block 56 is driven to the left as viewed in FIG. 1, and when fluid pressure is supplied through nipple 80a to bore 80, the cam-block 56 is driven to the right as viewed in FIG. 1. When cam-block 56 is at the left, then tool carrier 40 is lowered and retracted, while when cam-block 56 is at the right as in FIG. 1, then the tool carrier 40 is raised and in position to cause tool T to engage the work W.

It will be understood that while the support member 30 is shown as a member separate from the adapter 12, if desired the support member 30 could be made integral with adapter 12 or the parts could be welded together to insure rigidity. It will also be understood that where fluid pressure has been referred to herein as being used for effecting movement of the cam-block 56, either compressed air or other gas, or hydraulic fluid under pressure could be used.

From the foregoing, it will be seen that the improved tool holder herein disclosed provides a support member 30 that is arranged and adapted to be supported on the normally definitive surface, or planar support, of a lathe or other machine tool, and said support member provides a planar guide surface 32 which is disposed at an incline toward the cutting plane at which the tool T is to engage work W. The tool carrier means including the tool carrier 40 is mounted upon the support member 30 for sliding movement along said guide surface 32, and cooperating means are provided between the support member 30 and the tool carrier 40 for effecting selective movement of the tool carrier in only opposite directions along, and parallel to, the guide surface 32 with the end that when the tool carrier moves in one direction it moves the tool T thereon inwardly and toward the cutting plane at which tool T operates, while movement of the carrier in the opposite direction moves the tool outwardly and downwardly away from the cutting plane at which the tool T is to engage the work. It will be appreciated that movement of tool T away from the cutting plane may also be outwardly and upwardly away from the cutting plane.

By use of the foregoing tool holder, there is provided a device that is adaptable for use on either side of the work piece, while still retaining its ultimate purpose of avoiding drag lines on the work. It will be evident to those skilled in the art how use of this tool holder may be effected in a double facing operation of flanges so as to avoid drag lines on the work and in other ways to provide for longitudinal cuts on the work, while avoiding drag lines thereon.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A tool holder for use with a metal turning machine so as to avoid withdrawal marks by the tool on the finished work of the machine, wherein the work is held for rotation about an axis spaced from a planar support defined on the machine, and the tool is adapted to engage the work along a line that lies in a cutting plane which is perpendicular to the planar support; said tool holder comprising, in combination: a support member adapted to be supported on the planar support and providing a planar guide surface which is disposed at an incline toward said cutting plane as the guide surface extends in a direction from said planar support toward said work, tool carrying means mounted upon said support member for sliding movement along said planar guide surface, cooperating cam means between said support member and said tool carrying means for effecting selective movement of said tool carrying means in only opposite directions along said planar guide surface, so as to move the tool engaging means in one direction inwardly and toward the said cutting plane and in an opposite direction outwardly and away from said cutting plane.

2. A tool holder as in claim 1 wherein the cooperating cam means includes a cam block on said support member arranged for reciprocation along a line parallel to said guide surface, a cam follower operatively associated with said tool carrying means and arranged in operative engagement with said cam block, and one of said cam block and cam follower elements being a slot that is inclined to the directions of reciprocation of the tool carrying means while the other elements enters said slot to slide therealong.

3. A tool holder as in claim 2 wherein the angle of inclination of the slot is no more than 16°.

4. A tool holder as in claim 1 wherein the included angle between the plane of the guide surface and said cutting plane is about 5°.

5. A tool holder as in claim 1 wherein the cooperating cam means includes a cam member slidably mounted on said support member, piston means connected to said cam member for effecting movement thereof, and means for selectively applying force to said piston means to effect selective movement of the tool carrying means through movement of said cam member.

6. A tool holder as in claim 1 including an adapter that is rigidly connected to said support member and which is provided with channel means therein adapted for sliding connection to the ways of a normally definitive surface on the machine.

References Cited

UNITED STATES PATENTS 3,000,247   9/1961   Saunders _____ 82—35
3,010,344  11/1961   Christensen.

WILLIAM W. DYER, Jr., *Primary Examiner.*
LEONIDAS VLACHOS, *Examiner.*